United States Patent
Yagyu et al.

(10) Patent No.: US 10,989,609 B2
(45) Date of Patent: Apr. 27, 2021

(54) THERMISTOR FILM AND METHOD OF DEPOSITING THE SAME

(71) Applicant: FLOSFIA INC., Kyoto (JP)

(72) Inventors: Shingo Yagyu, Kyoto (JP); Takahiro Sasaki, Kyoto (JP); Toshimi Hitora, Kyoto (JP)

(73) Assignee: FLOSFIA INC., Kyoto (JP)

( * ) Notice: Subject to any disclaimer, the term of this patent is extended or adjusted under 35 U.S.C. 154(b) by 0 days.

(21) Appl. No.: 16/611,291

(22) PCT Filed: Apr. 27, 2018

(86) PCT No.: PCT/JP2018/017307
§ 371 (c)(1),
(2) Date: Nov. 6, 2019

(87) PCT Pub. No.: WO2018/207676
PCT Pub. Date: Nov. 15, 2018

(65) Prior Publication Data
US 2020/0166415 A1    May 28, 2020

(30) Foreign Application Priority Data
May 9, 2017 (JP) .............................. JP2017-092810

(51) Int. Cl.
*G01K 7/22* (2006.01)
*H01C 7/04* (2006.01)
*H01C 17/18* (2006.01)

(52) U.S. Cl.
CPC ............ *G01K 7/22* (2013.01); *H01C 7/041* (2013.01); *H01C 17/18* (2013.01)

(58) Field of Classification Search
CPC ........... H01C 7/041; H01C 17/18; G01K 7/22
See application file for complete search history.

(56) References Cited

U.S. PATENT DOCUMENTS 5,367,285 A * 11/1994 Swinehart ............... H01C 1/14
                                                                204/192.21
5,668,524 A *  9/1997 Aida ...................... H01C 1/012
                                                                    279/128

(Continued)

FOREIGN PATENT DOCUMENTS

| JP | 03-174701 | 7/1991 |
| JP | 2010-251757 | 11/2010 |

(Continued)

OTHER PUBLICATIONS

JP 2012-204343, Shin et al., machine translation. (Year: 2012).*

(Continued)

*Primary Examiner* — Kyung S Lee
(74) *Attorney, Agent, or Firm* — Wenderoth, Lind & Ponack, L.L.P.

(57) ABSTRACT

Under predetermined film depositing conditions, the raw material solution of the thermistor film is atomized or dropletized, the carrier gas is supplied to the obtained mist or droplet, the mist or droplet is conveyed to the substrate, and then the mist or droplet is thermally reacted on the substrate to deposit a film. A resultant thermistor thin film has a film thickness of 1 μm or less, a film width of 5 mm or more, a thickness of 50 nm or more and 5 μm or less, a thickness in the range of less than ±50 nm, a thickness of 5 mm or less, and/or a thickness of 50 nm or more and 5 μm or less, and has a film surface roughness (Ra) of 0.1 μm or less.

9 Claims, 9 Drawing Sheets

(56) References Cited

U.S. PATENT DOCUMENTS

| | | | | |
|---|---|---|---|---|
| 6,210,625 | B1* | 4/2001 | Matsushita | B01J 2/006 |
| | | | | 264/109 |
| 6,337,991 | B1* | 1/2002 | Li | C30B 23/02 |
| | | | | 257/E31.022 |
| 8,198,978 | B2* | 6/2012 | Schultes | G01L 1/18 |
| | | | | 29/620 |
| 9,174,543 | B2* | 11/2015 | Hwang | B60L 50/64 |
| 2013/0168611 | A1* | 7/2013 | Zhou | H01G 11/30 |
| | | | | 252/506 |
| 2015/0170805 | A1* | 6/2015 | Ito | H01C 7/04 |
| | | | | 338/22 SD |
| 2016/0222511 | A1 | 8/2016 | Sasaki et al. | |
| 2017/0108752 | A1* | 4/2017 | Milliron | G02F 1/0147 |
| 2019/0393394 | A1* | 12/2019 | Moon | H01L 35/26 |

FOREIGN PATENT DOCUMENTS

| | | |
|---|---|---|
| JP | 2012-46772 | 3/2012 |
| JP | 2012-204343 | 10/2012 |
| JP | 2015-115438 | 6/2015 |
| JP | 2016-100593 | 5/2016 |
| JP | 2016-146442 | 8/2016 |
| WO | WO2014/010591 | 1/2014 |

OTHER PUBLICATIONS

JP 2016-100593, Takatsuka, machine translation. (Year: 2016).*
JP 03-174701, Okumura, machine translation. (Year: 1991).*
International Search Report dated Jul. 24, 2018 in International (PCT) Application No. PCT/JP2018/017307.

* cited by examiner

FIG. 9

THERMISTOR FILM AND METHOD OF DEPOSITING THE SAME

TECHNICAL FIELD

The disclosure relates to a thermistor film useful for a thermistor element and a method of depositing the same.

BACKGROUND

Conventionally, in a product such as an electronic apparatus or a system including an electronic apparatus, a temperature sensor or a gas sensor is used for temperature compensation of the electronic apparatus, and a thermistor is used for those sensors. Types of the thermistors include a negative temperature coefficient (NTC) thermistor and a positive temperature coefficient (PTC) thermistor.

Negative temperature coefficient (NTC) thermistors are thermistors that utilize the phenomenon that the resistance decreases as the temperature increases, and have a strong property of a semiconductor whose resistance decreases exponentially over a wide range of temperatures, and most thermistors correspond to this type. Positive temperature coefficient (PTC) thermistors are special thermistors that utilize a phenomenon in which resistance increases rapidly when the increased temperature exceeds a certain temperature, and it is considered that this is caused by a change in dielectric properties that affect electrical properties that cause a large resistance change even in a very small temperature range in an inter-particle region.

In recent years, downsizing and thinning of electronic devices have progressed, and downsizing and thinning of temperature sensors and gas sensors used in electronic devices and thermistor elements used in these sensors have also been demanded. Although thermistor elements using thermistor thin films have been investigated in response to such requirements, they have not been satisfactory because of poor mechanical strength or insufficient thermistor characteristics.

Patent Literature 1 describes an NTC thermistor film deposited by a room temperature vacuum powder injection method. However, the NTC thermistor film disclosed in Patent Literature 1 has problems such as a low mechanical strength, a difficulty in depositing thin films, and a need for a complicated process using a vacuum apparatus.

Patent Literature 2 describes a thermistor film deposited by an aerosol deposition method. However, when trying to obtain a thermistor film by an aerosol deposition method, it is difficult to obtain a dense film with good thermistor characteristics unless the aerosol having thermistor raw material fine particles is injected vigorously with a nozzle having a small diameter and is strongly collided with the substrate, and even if such a film is obtained, it is difficult to widen the area of the film, and even if the film is formed over a long time, the surface flatness is poor. Therefore, the thermistor film deposited by the method described in Patent Literature 2 has a problem that the thermistor characteristic is insufficient unless the film is a thick film of several microns or more, or a satisfactory film has not yet been obtained.

As described above, even if a thermistor film is to be obtained, when thermistor raw material fine particles are simply deposited, the mechanical strength of the film is low and the thermistor characteristics are insufficient, and even when the thermistor raw material fine particles are sprayed onto the substrate and collided to form a film, sufficient thermistor characteristics cannot be obtained unless a thick film of several microns or more is formed, and there are problems such that the surface flatness of the film which can obtain such thermistor characteristics is also poor.

PRIOR ART DOCUMENT

Patent Literature

Japanese Patent Application Laid-Open No. 2010-251757 [Patent Literature 1]
Japanese Patent Application Laid-Open No. 2015-115438 [Patent Literature 2]

SUMMARY OF THE DISCLOSURE

Technical Problem

An object of the disclosure is to provide a thermistor film having excellent thermistor characteristics and improved mechanical strength, and a film depositing method thereof.

Solution to Problem

As a result of intensive investigation to achieve the above object, the inventors have succeeded in depositing a thermistor film by a mist CVD method using a crystal substrate, and have found that the thermistor film thus obtained has excellent thermistor characteristics, high mechanical strength, and excellent thermistor film even without a vacuum apparatus or a baking step. In addition, the inventors have found that a thermistor film obtained by atomizing or droplet a raw material solution of a thermistor film, supplying a carrier gas to the obtained mist or droplet, conveying the mist or droplet to a substrate, and then thermally reacting the mist or droplet on the substrate to deposit a film indicates excellent thermistor characteristics even without annealing treatment and even when the film thickness is 1 µm or less, and have found that such a thermistor film has a small dispersion of film thickness distribution and excellent surface smoothness, and have found that such a thermistor film and a method of depositing the thermistor film can solve the problems at once.

In addition, the inventors have obtained the above-mentioned findings, and then have further investigated them to complete the disclosure.

That is, the disclosure relates to the followings.
[1] A thermistor film used in a thermistor element, wherein the thermistor film is an epitaxial film.
[2] A thermistor film for use in a thermistor element, wherein the thermistor film has a thickness of 1 µm or less.
[3] A thermistor film for use in a thermistor element, wherein the thermistor film has a width of 5 mm or more, a thickness of 50 nm or more and 5 µm or less, and a distribution of the thickness within a range of ±50 nm or less at the film width of 5 mm.
[4] A thermistor film for use in a thermistor element, wherein the thickness is 50 nm or more and 5 µm or less, and the surface roughness (Ra) of the film is 0.1 µm or less.
[5] The thermistor film according to any one of [1] to [4], wherein the thermistor film is a metal oxide film containing one or more kinds of transition metals.
[6] The thermistor film according to any one of [1] to [5], wherein the thermistor film is a metal oxide film containing at least Ni, Mn or Fe.
[7] The thermistor film according to any one of [1] to [6], wherein the thermistor film includes a spinel-type crystal structure.

[8] The thermistor film according to any one of the above [1] to [7], wherein the thermistor film contains γ-MnO$_2$.
[9] A thermistor element comprising at least a thermistor film and an electrode, wherein the thermistor film is the thermistor film according to any one of [1] to [8].
[10] The thermistor element according to [9], wherein the thermistor film is laminated on a substrate having an uneven shape on a part or the whole of the surface directly or via another layer.
[11] A method of depositing a thermistor film for use in a thermistor element, wherein a raw material solution of the thermistor film is atomized or droplets are formed, and the obtained mist or droplets are thermally reacted on a substrate having crystals on a part or all of the surface thereof to deposit a film.
[12] A method of depositing a thermistor film for use in a thermistor element, wherein a raw material solution of the thermistor film is atomized or droplets are formed, a carrier gas is supplied to the obtained mist or droplet and the mist or droplet is conveyed to a substrate, and the mist or droplet is thermally reacted on the substrate to deposit a film.
[13] The film depositing method according to [11] or [12], wherein the raw material solution contains one or more kinds of transition metals.
[14] The film depositing method according to any one of [11] to [13], wherein the raw material solution contains one or more kinds of metals selected from Ni, Mn, and Fe.
[15] The film depositing method according to any one of [11] to [14], wherein the atomization or droplet formation is performed by using ultrasonic waves.
[16] A method of manufacturing a thermistor element by stacking a thermistor film and an electrode, wherein the thermistor film is deposited by the film depositing method according to any one of [11] to [15] above.
[17] A product or system including the thermistor element according to [9] or [10].

Advantageous Effects

According to the disclosure, a thermistor film excellent in thermistor characteristics, high in mechanical strength, and advantageously deposited industrially can be easily obtained.

DESCRIPTION OF EMBODIMENTS

The thermistor film of the disclosure is a thermistor film used for a thermistor element, and is characterized in that the thermistor film is an epitaxial film. The thermistor film of the disclosure is a thermistor film used in a thermistor element and has a thickness of 1 μm or less. The thermistor film of the disclosure is a thermistor film used in a thermistor element, and is characterized in that the film width is 5 mm or more, the film thickness is 50 nm or more and 5 μm or less, and the distribution of the film thickness in the film width 5 mm includes within a range of less than ±50 nm. The thermistor film of the disclosure is a thermistor film used in a thermistor element, and has a film thickness of 50 nm or more and 5 μm or less, and a surface roughness Ra of the film is 0.1 μm or less. The thermistor film used in the thermistor element is not particularly limited as long as it has a thermistor characteristic, and may have an NTC thermistor characteristic or a PTC thermistor characteristic; however, in the disclosure, the NTC thermistor characteristic is preferable. The epitaxial film is not particularly limited as long as it is a film obtained by crystal growth, but in the disclosure, it is preferable that the epitaxial film is a mist CVD film obtained by a mist CVD method.

The thermistor film preferably contains metal and oxygen as main components. Here, the "main component" may be, for example, when the thermistor film includes a metal oxide film as a main component, if the metal oxide in the film is contained in an atomic ratio of 0.5 or more. In the disclosure, the metal oxide in the film preferably has an atomic ratio of 0.7 or more, more preferably 0.8 or more. The metals include, for example, one or more kinds of metals belonging to Groups 3 to 15 of the Periodic Table, preferably one or more kinds of transition metals, and more preferably one or more kinds of metals of Groups 7 to 10 of the Periodic Table. In the disclosure, the metal preferably contains at least Ni, Mn, or Fe, and more preferably at least Ni, Mn, and Fe. In the disclosure, the thermistor film is preferably a metallic oxide film containing at least Ni, Mn, or Fe, and more preferably contains γ-MnO$_2$. The thermistor film of the disclosure is preferably a mixed crystal of the metal oxide film, and preferably has a spinel-type crystal structure. Such a preferable thermistor film can be obtained according to a preferable embodiment described below.

In the disclosure, the thickness of the thermistor film is preferably 10 μm or less, more preferably 5 μm or less, and most preferably 1 μm or less. In the disclosure, the thermistor film may be a flexible thermistor film because the thermistor characteristics are good even in a thin film having a thickness of 1 μm or less, and more preferably 0.5 μm or less. In the disclosure, it is preferable that the thermistor film has a film width of 5 mm or more, a film thickness of 50 nm or more and 5 μm or less, and the thermistor film has a distribution of the film thickness within a range of less than ±50 nm at the film width of 5 mm. In the disclosure, the "distribution of film thickness" refers to the difference between the maximum film thickness and the minimum film thickness with respect to the average film thickness of the thermistor film, and can be calculated by a conventional method using a spatial frequency for convenience. In the disclosure, it is also preferable that the thermistor film has a film thickness of 50 nm or more and 5 μm or less, and that the surface roughness Ra of the thermistor film is 0.1 μm or less. The surface roughness (Ra) is a value obtained by calculating the surface roughness (Ra) based on a JISB0601 using a surface profile measuring result of an atomic force microscopy (AFM) in an area of 10 μm square. Such a preferable thermistor film can be manufactured by atomizing or droplet a raw material solution of the thermistor film under a predetermined condition, supplying a carrier gas to the obtained mist or droplet, conveying the mist or droplet to a substrate, and then thermally reacting the mist or droplet on the substrate to deposit a film. Hereinafter, a preferable film depositing method of the disclosure will be described.

Substrate

The substrate is not particularly limited, and may be crystalline or amorphous. The material of the substrate is not particularly limited as long as it does not hinder the object of the disclosure, and may be a known substrate, an organic compound, or an inorganic compound. The shape of the substrate may be any shape, and is effective for any shape, and for example, plate-like, fiber-like, rod-like, columnar, prismatic, cylindrical, spiral, spherical, ring-like, or the like such as a flat plate or a disk is given, but in the disclosure, a substrate is preferable. In the disclosure, it is preferable that the substrate has a crystal on part or all of its surface, it is more preferable that the substrate has a crystal on all or part of the main surface of the crystal growth side, and it is most preferable that the substrate has a crystal on all of the main surface of the crystal growth side. The crystal is not particularly limited as long as it does not hinder the object of the disclosure, but a trigonal crystal or a hexagonal crystal is preferable, and a crystal having a corundum structure is more preferable. In the disclosure, for example, when the crystal substrate has a corundum structure, it is preferable that the main surface is a c-plane, an a-plane or an m-plane because the thermistor characteristics can be further improved. The crystal substrate may have an off angle, and the off angle includes, for example, an off angle of 0.2° to 12.0°. Here, the "off angle" refers to an angle formed by the substrate surface and the crystal growth surface. The substrate shape is not particularly limited as long as it is a plate shape and serves as a support of the crystalline oxide semiconductor film. The substrate may be an insulator substrate, a semiconductor substrate, a conductive substrate, or a substrate having a metal film on its surface is also preferable. The shape of the substrate is not particularly limited, and may be a substantially circular shape (for example, a circular shape, an oval shape, or the like), or may be a polygonal shape (for example, a triangle, a square, a rectangle, a pentagon, a hexagon, a heptagon, an octagon, a nonagon, or the like), and various shapes can be suitably used. In the disclosure, the shape of the film formed on the substrate can be set by setting the shape of the substrate to a preferable shape. In the disclosure, a substrate having a large area can be used, and by using such a substrate having a large area, the area of the thermistor film can be increased. The substrate material of the crystal substrate is not particularly limited as long as it does not hinder the object of the disclosure, and may be a well-known material. As the substrate material having the corundum structure, for example, $\alpha$-$Al_2O$ (sapphire substrate) or $\alpha$-$Ga_2O_3$ is suitably cited, and c-plane sapphire substrate, a-plane sapphire substrate, m-plane sapphire substrate or $\alpha$-gallium oxide substrate (c-plane, $\alpha$-plane or m-plane) is more suitably cited.

Further, in the disclosure, it is preferable that the base body has an uneven shape, such as a concavo-convex shape on a part or the whole of the surface. The substrate having the concavo-convex shape may be a concave portion or a convex portion made up of a concavo-convex portion may be formed on a part or all of the surface, the concavo-convex portion is not particularly limited as long as it is made up of a convex portion or a concave portion, may be a concavo-convex portion made up of a concave portion, or may be a concavo-convex portion made up of a convex portion and a concavo-convex portion made up of a concavo-convex portion. The concavo-convex portion may be formed from a regular convex portion or a regular concave portion, or may be formed from an irregular convex portion or an irregular concave portion. In the disclosure, it is preferable that the concavo-convex portions are formed periodically, and it is more preferable that they are patterned periodically and regularly. The shape of the concavo-convex portion is not particularly limited, and may be, for example, a stripe shape, a dot shape, a mesh shape, or a random shape, but in the disclosure, a dot shape or a stripe shape is preferable, and a dot shape is more preferable. When the concavo-convex portions are patterned periodically and regularly, it is preferable that the pattern shape of the concavo-convex portions is a polygonal shape such as a triangle, a quadrangle such as a square, a rectangle, or a trapezoid for example, a pentagon, a hexagon, or the like, a circle, an oval, or the like. In the case of forming the concavo-convex portion in a dot shape, the grid shape of the dot is preferably a grid shape such as a square grid, an oblique grid, a triangular grid, or a hexagonal grid, for example, and more preferably a grid shape of a triangular grid. The cross-sectional shape of the concave portion or the convex portion of the concavo-convex portion is not particularly limited, and for example, a channel shape, a U-shape, an inverted U-shape, a wave shape, a triangle, a quadrangle such as a square, a rectangle, or a trapezoid for example, a polygon such as, a pentagon, a hexagon, or the like can be given.

Further, in the disclosure, since good NTC thermistor characteristics can be obtained without annealing, for example, it is also preferable that the substrate contains an organic material or a low melting point inorganic material. The organic material includes a resin for example, and the resin includes a thermoplastic resin, a thermosetting resin, and the like. As the thermoplastic resin, for example, a polyester resin such as a polyethylene terephthalate resin (PET resin), a polybutylene terephthalate resin (PBT resin), a polytrimethylene terephthalate resin (PTT resin), a polyethylene naphthalate resin (PEN resin), and a liquid crystal polyester resin, a polyolefin resin such as a polyethylene resin (PE resin), a polypropylene resin (PP resin), a polyolefin resin such as a polybutylene resin, a styrene resin, a polyoxymethylene resin (POM resin), a polyamide resin (PA resin), a polycarbonate resin (PC resin), a polymethyl methacrylate resin (PMMA resin), a polyvinyl chloride resin (PVC resin), a polyphenylene sulfide resin (PPS resin), a polyphenylene ether resin (PPE resin) a polyphenylene oxide resin (PPO resin), a polyimide resin (PI resin), a polyamide imide resin (PAI resin), a polyetherimide resin (PEI resin), a polysulfide resin (PSU resin), a polyether sulfone resin, a polyketide resin (PK resin), a polyether ketone resin (PEK resin), a polyether ether ketone resin (PEEK resin), a polyarylate resins (PAR resins), a polyether nitrile resin (PEN resin), a phenolic resin (e.g., novolak type phenolic resin plate), a phenoxy resin, a fluorine resin, polystyrene resin, a thermoplastic elastomer such as polyolefin system, polyurethane system, polyester system, polyamide system, polybutadiene system, polyisoprene system or fluorine system, or a copolymer or a modified resin thereof. Examples of the thermosetting resin include a phenol resin, an epoxy resin, an epoxy acrylate resin, a polyester resin (for example, unsaturated polyester resin, etc.), a polyurethane resin, a diallyl phthalate resin, a silicon resin, a vinyl ester resin, a melamine resin, a polyimide resin, a polybismaleimide triazine resin (BT resin), a cyanate resin (for example, cyanate ester resin, etc.), a copolymer resin thereof, a modified resin obtained by modifying these resins, and mixtures thereof. The low melting point inorganic material is, for example, a low melting point metal, metal alloy, metal compound, glass, or the like, and suitably, a low melting point metal or alloy containing indium, antimony, tin, bismuth, or lead as a main component, a metal compound thereof, low melting point glass, or the like is given.

Raw Material Solution

The raw material solution is not particularly limited as long as it is a raw material solution of a thermistor film and can be atomized or droplet, and may contain an inorganic material or an organic material. In the disclosure, the raw material solution usually contains a metal. The metal may be a simple metal or a metal compound, and is not particularly limited as long as it does not hinder the object of the disclosure. The metal includes, for example, one or more metals belonging to Groups 3 to 15 of the Periodic Table, preferably a transition metal, and more preferably metals belonging to Groups 7 to 10 of the Periodic Table. In the disclosure, the metal preferably contains at least Ni, Mn, or Fe, and more preferably at least Ni, Mn, and Fe. The content of the metal in the raw material solution is not particularly limited, but is preferably 0.001% by weight to 80% by weight, more preferably 0.01% by weight to 80% by weight.

In the disclosure, as the raw material solution, a solution obtained by dissolving or dispersing the metal in the form of a complex or a salt in an organic solvent or water can be suitably used. As the form of the complex, for example, an acetylacetonato complex, a carbonyl complex, an ammine complex, a hydride complex, or the like can be given. The salt forms include, for example, organometallic salt (e.g., metal acetate, metal oxalate, metal citrate, etc.), metal sulfide salt, nitrided metal salt, phosphorylated metal salt, metal halide salt (e.g., metal chloride salt, metal bromide salt, metal iodide salt, etc.), and the like.

The solvent of the raw material solution is not particularly limited, and may be an inorganic solvent such as water, an organic solvent such as alcohol, or a mixed solvent of an inorganic solvent and an organic solvent. In the disclosure, the solvent preferably contains water, more preferably water or a mixed solvent of water and alcohol, and most preferably water. More specifically, the water includes, for example, pure water, ultrapure water, tap water, well water, mineral spring water, mineral water, hot spring water, spring water, fresh water, seawater, and the like, but in the disclosure, ultrapure water is preferable.

In addition, additives such as hydrohalic acid and an oxidizing agent may be mixed with the raw material solution. The hydrohalic acid includes, for example, hydrobromic acid, hydrochloric acid, hydroiodic acid, and the like, and among these, hydrobromic acid or hydroiodic acid is preferable. Examples of the oxidizing agent include hydrogen peroxide ($H_2O_2$), sodium peroxide ($Na_2O_2$), barium peroxide ($BaO_2$), benzoyl peroxide (peroxide such as $(C_6H_5CO)_2O_2$), hypochlorous acid (HClO), perchloric acid, nitric acid, ozonized water, and organic peroxides such as peracetic acid and nitrobenzene.

The raw material solution may contain a dopant. By including a dopant in the raw material solution, the properties of the obtained film can be controlled. The dopant is not particularly limited as long as it does not inhibit the object of the disclosure. Examples of the dopant include tin, germanium, silicon, titanium, zirconium, vanadium, niobium, antimony, tantalum, fluorine, chlorine, boron, phosphorus, arsenic, aluminum, lithium, gallium, bismuth, indium, cobalt, iron, copper, manganese, nickel, magnesium, strontium, calcium, yttrium, lanthanum, cerium, and the like. In the disclosure, the dopant preferably contains antimony, boron, phosphorus, arsenic, aluminum, lithium, gallium, bismuth, indium, cobalt, iron, copper, manganese, nickel, magnesium, strontium, calcium, yttrium, lanthanum, or fluorine. The concentration of the dopants may be, for example, a low concentration of about $1 \times 10^{17}$ per $cm^3$ or less or a high concentration of about $1 \times 10^{21}$ per $cm^3$ or more.

(Atomization/Droplet Forming Step)

In the atomizing and droplet forming step, the raw material solution is atomized or droplet to generate mist or droplet. The atomizing or droplet forming means is not particularly limited as long as it can atomize or droplet the raw material solution, and may be a known atomizing means, but in the disclosure, it is preferable that the atomizing means is an atomizing means using ultrasonic waves. Preferably, the mist has an initial velocity of zero and is suspended in the air, and more preferably, it is a mist capable of being conveyed as a gas floating in the space, rather than being sprayed like a spray, for example. The droplet size of the mist is not particularly limited, and may be a droplet of about several mm, but is preferably 50 μm or less, more preferably 1 to 10 μm.

Conveying Step

In the conveying step, a carrier gas is supplied to the mist or droplet obtained in the atomizing and droplet forming step, and the mist or droplet is conveyed to the substrate using a carrier gas. The type of the carrier gas is not particularly limited as long as it does not hinder the object of the disclosure, and for example, an inert gas such as oxygen, ozone, nitrogen, or argon, or a reducing gas such as hydrogen gas or forming gas can be given as suitable examples. In the disclosure, the carrier gas is more preferably oxygen or an inert gas. In addition, the type of the carrier gas may be one type, but may be two or more types, and a dilution gas in which the carrier gas concentration is changed (e.g., a 10-fold dilution gas) or the like may be further used as the second carrier gas. Further, the carrier gas may be supplied not only at one point but also at two or more points. The flow rate of the carrier gas is not particularly limited, but is preferably 0.01 to 20 L/min, more preferably 1 to 10 L/min. When the diluent gas is used, the flow rate of the diluent gas is preferably 0.001 to 10 L/min, more preferably 0.1 to 5 L/min.

Deposition Step

In the deposition step, the thermistor film is deposited on the substrate by thermally reacting the mist or the droplet. The thermal reaction may be any reaction as long as the mist reacts with heat, and the reaction conditions and the like are not particularly limited as long as they do not hinder the object of the disclosure. In this step, the thermal reaction is usually carried out at a temperature equal to or higher than the evaporation temperature of the solvent, but a temperature which is not excessively high (e.g., 800° C.) or lower is preferable, 600° C. or lower is more preferable, and 500° C. or lower is most preferable. The thermal reaction may be performed under any of a vacuum, a non-vacuum, a non-oxygen atmosphere, a reducing gas atmosphere, and an oxygen atmosphere; however, in the disclosure, it is preferable that the thermal reaction be performed under a non-vacuum atmosphere, and more preferably under a nitrogen atmosphere or an oxygen atmosphere. The thermal reaction may be carried out under any of the conditions of atmospheric pressure, pressurization, and depressurization, but in the disclosure, it is preferable to carry out the thermal reaction under atmospheric pressure. In addition, the film thickness of the obtained film can be easily adjusted by adjusting the deposition time. In the disclosure, the thermistor film may be a single layer film or a multi-layer film.

In the disclosure, it is also preferable to perform annealing after the deposition step. The annealing treatment temperature is not particularly limited as long as it does not hinder the object of the disclosure, and is usually 300° C. to 1100° C., preferably 500° C. to 1000° C. The annealing treatment time is usually from 1 minute to 48 hours, preferably from 10 minutes to 24 hours, more preferably from 30 minutes to 12 hours. Note that the annealing treatment may be performed under any atmosphere as long as it does not hinder the object of the disclosure, but it is preferably a non-oxygen atmosphere, and more preferably a nitrogen atmosphere.

The thermistor film obtained as described above is used as a thermistor element by laminating the thermistor film with an electrode using a known means, as it is, or after being subjected to treatment such as peeling or processing. In addition, the thermistor element is used as a temperature sensor, a gas sensor, or the like based on a conventional method, and the temperature sensor, the gas sensor, or the like on which the thermistor element is mounted is further applied to a product or a system of an electronic device or the like using known means. Examples of the products include home electric appliances and industrial products, and more specifically, for example, an electric appliance mounted on a CPU such as a digital camera, a printer, a projector, a personal computer, or a cellular phone, an electric appliance mounted on a power supply unit such as a vacuum cleaner or an iron, or a generator (fuel cell stack), and the like are suitable examples. In the disclosure, it is desirable to use the conducting member in a product with a drive means in accordance with normal methods, and products with such drive means include, for example, motors, drive mechanisms, electric vehicles, electric carts, electric wheelchairs, electric toys, motorized aircraft, small electric vehicles, MEMS, and the like. Further, in the disclosure, it can be suitably used for a system including at least the product and the CPU. The home electric appliances and industrial products are not particularly limited, and include, for example, white goods home appliances (e.g., air conditioners, refrigerators, washing machines, etc.), audio equipment, home electric appliances, video equipment, cosmetic hairdressing equipment, personal computers, game machines, portable terminals, business equipment, gas processors, CPU-mounted equipment, and the like.

Figure 7:
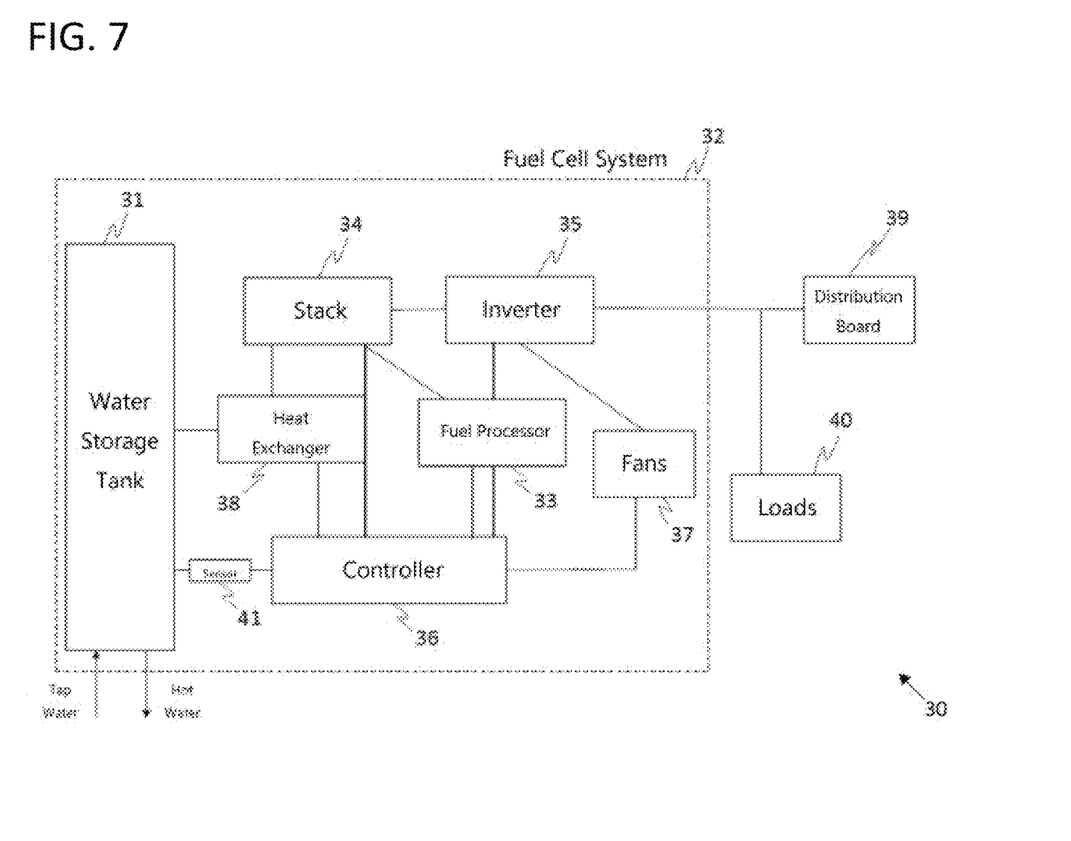
FIG. 7 is a block diagram illustrating a preferred embodiment of a fuel cell system in which the product of the disclosure is applied.

A preferred embodiment using the temperature sensor or the gas sensor is described, but the disclosure is not limited thereto. FIG. 7 is a block diagram illustrating an example of a power generation system including the product (temperature sensor) and a CPU (controller). The power generation system 30 includes, for example, a fuel cell system 32, and the fuel cell system 32 includes a fuel processor 33 for generating a fuel gas containing hydrogen as a main component by steam reforming, a water shift reaction, and a selective oxidation reaction of a raw material gas such as city gas, a stack (fuel cell stack) 34 for generating electricity by chemically reacting the fuel gas supplied from the fuel processor 33 with an oxidant gas, an inverter 35 for exchanging output DC power obtained by power generation of the stack 34 with AC power, a controller (CPU) 36 for controlling a series of operations of starting, generating, terminating, and stopping the fuel cell system 32, a blower 37 for supplying air containing oxygen by the oxidant gas to the stack 34, and a heat exchanger 38 for recovering heat generated when the stack 34 generates electricity and storing the heat as hot water in a storage tank. and. In FIG. 7, the fuel cell system 32 is connected to commercial alternating current through a distribution board 39 installed in a home, for example. Between the distribution board 39 and the fuel cell system, a load 40 such as a home electric appliance or an industrial product is connected. When power generation is started by the stack 34, electricity is supplied to the load 40 via the inverter 35, the load 40 operates, and further, heat generated by power generation of the stack 34 is utilized, so that hot water can be efficiently stored in the water storage tank 31. The water storage tank 31 is provided with a temperature sensor as a sensor 41, and controls the temperature of the water storage tank 31. Although not shown, a gas sensor is also provided in the fuel processor 33 to control the generation of fuel gas.

As described above, the thermistor film is useful in any system in which a temperature sensor or a gas sensor can be used.

Hereinafter, examples of the disclosure will be described, but the disclosure is not limited thereto.

Example 1

1. Deposition Apparatus and Method

Figure 1:
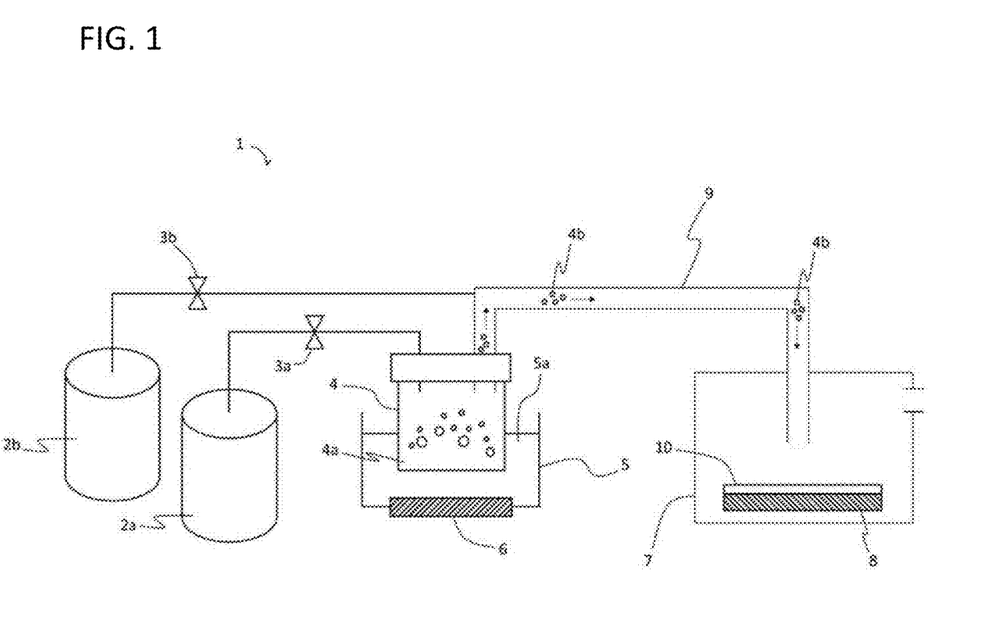
FIG. 1 is a schematic view illustrating configuration diagram of a film depositing apparatus (mist CVD apparatus) used in Example 1.

The mist CVD apparatus 1 used in an embodiment will be described with reference to FIG. 1. The mist CVD device 1 includes: a carrier gas source 2a for supplying a carrier gas; a flow rate adjusting valve 3a for adjusting a flow rate of a carrier gas supplied from a carrier gas source 2a; a carrier gas (dilution) source 2b for supplying a carrier gas (dilution); a flow rate adjusting valve 3b for adjusting a flow rate of a carrier gas (dilution) supplied from a carrier gas (dilution) source 2b; a mist generating source 4 containing a source solution 4a; a container 5 containing a water 5a; an ultrasonic vibrator 6 attached to a bottom surface of the container 5; a deposition chamber 7; a feed pipe 9 connecting the mist generating source 4 to the deposition chamber 7; a hot plate 8 installed in the deposition chamber 7; and an exhaust port 11 for exhausting mist, liquid, and exhaust gas after thermal reaction. A substrate 10 is placed on the hot plate 8.

2. Preparation of Raw Material Solution

Iron-acetylacetonate ($Fe(acac)_3$), nickel-acetylacetonate aqueous solution ($Ni(acac)_2(H_2O)_2$), and manganese-acetylacetonate ($Mn(acac)_3$) were mixed with methanol in a molar ratio of 1:3:6, respectively, to prepare a 0.05 M methanol solution, which was used as a raw material solution.

3. Preparation for Deposition

The raw material solution 4a obtained in the above 2, was accommodated in the mist-generating source 4. Next, as the substrate 10, a sapphire substrate was placed on the hot plate 8, and the hot plate 8 was operated to raise the substrate temperature to 500° C. Next, the flow rate adjusting valve 3a was opened, a carrier gas was supplied into the deposition chamber 7 from the carrier gas supplying unit 2a as a carrier gas source, the atmosphere of the deposition chamber 7 was sufficiently replaced with the carrier gas, and then the flow rate of the carrier gas was adjusted to 1L per minute. Nitrogen was used as a carrier gas. Note that a carrier gas (dilution) was not used.

4. Deposition

Figure 2:
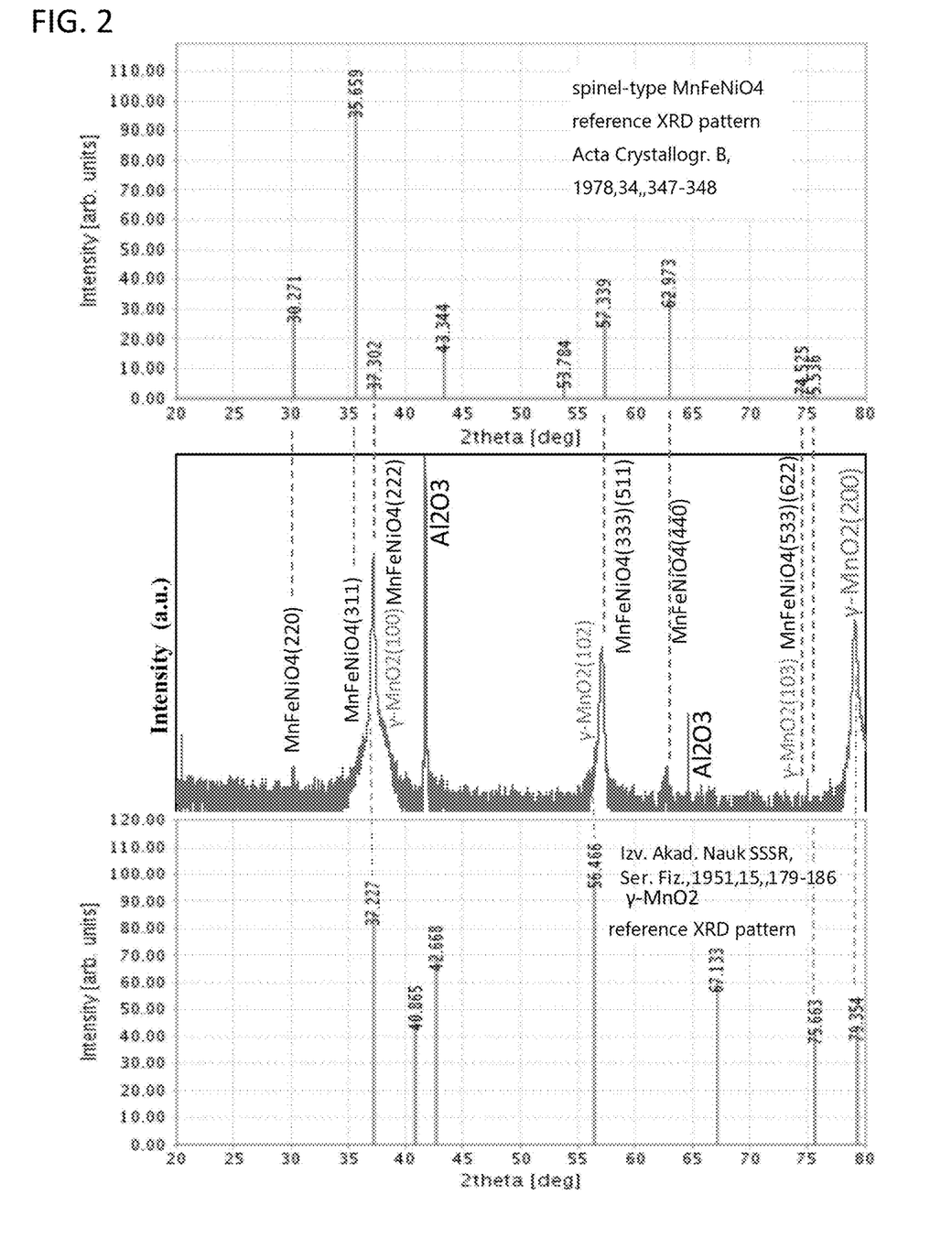
FIG. 2 is a graph showing XRD data in Example 1.
Figure 3:
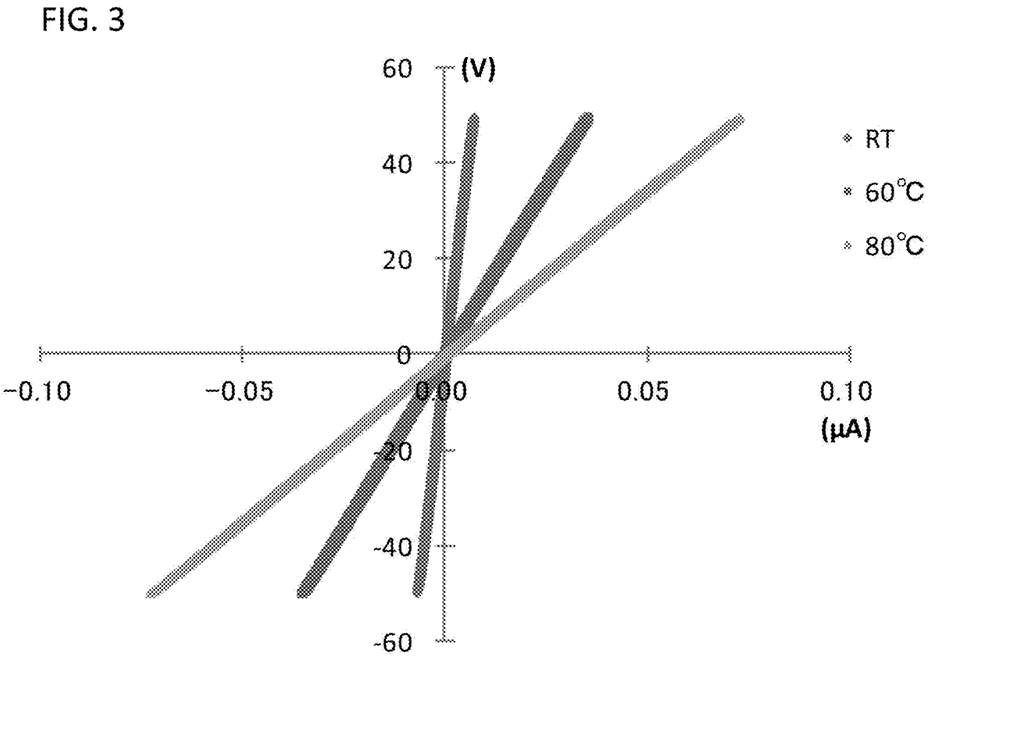
FIG. 3 is a graph showing the results of IV measurement in Example 1.
Figure 4:
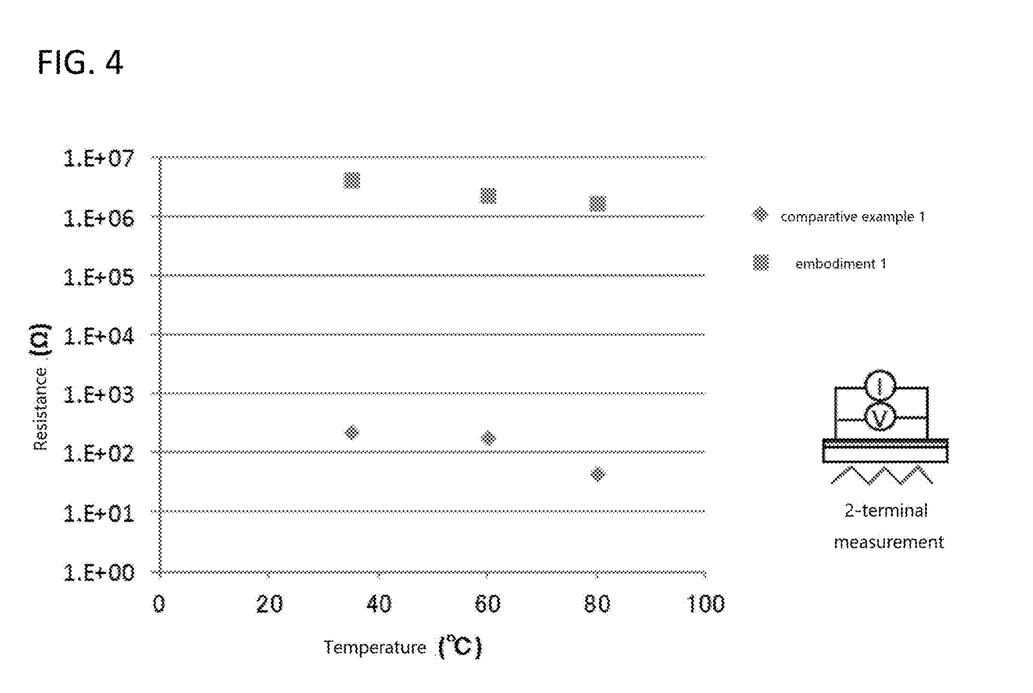
FIG. 4 is a graph showing evaluation results of thermistor characteristics in Example 1 and Comparative Example 1.

Next, the ultrasonic vibrator 6 was vibrated at 2.4 MHz, and the vibration was propagated to the raw material solution 4a through the water 5a, whereby the raw material solution 4a was atomized to generate the mist 4b. The mist 4b was introduced into the deposition chamber 7 through the feed pipe 9 by the carrier gas, and the mist was thermally reacted in the vicinity of the substrate 10 at 500° C. under atmospheric pressure, thereby depositing a 140 nm-thickness film on the substrate 10. The obtained film was excellent in adhesiveness and sufficient in mechanical strength without causing peeling or the like. The results of the XRD are shown in FIG. 2. The result of IV is shown in FIG. 3, and the evaluation result of the thermistor characteristics is shown in FIG. 4.

Comparative Example 1

Figure 5:
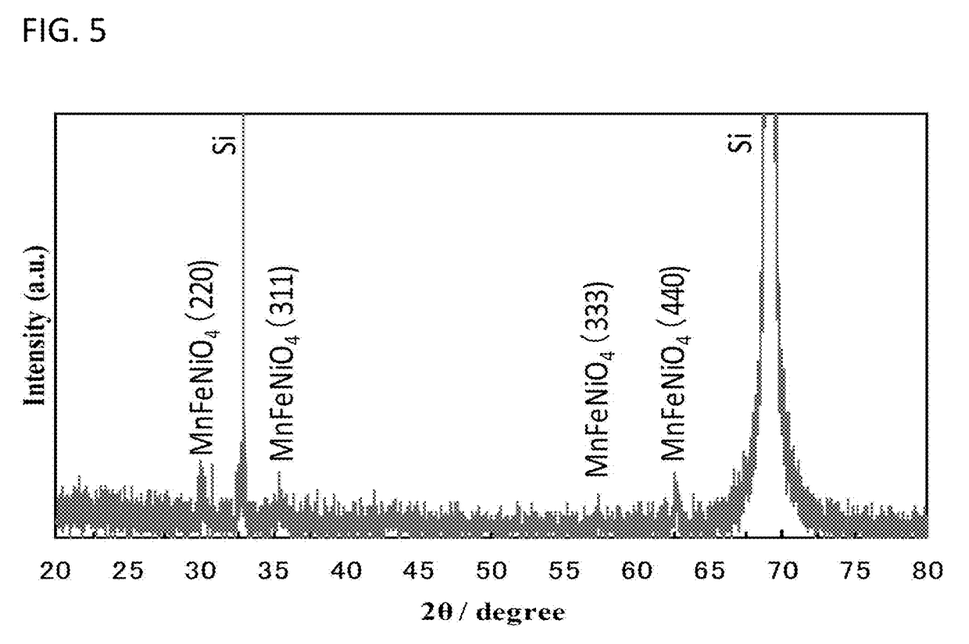
FIG. 5 is a graph showing XRD data in Comparative Example 1.
Figure 6:
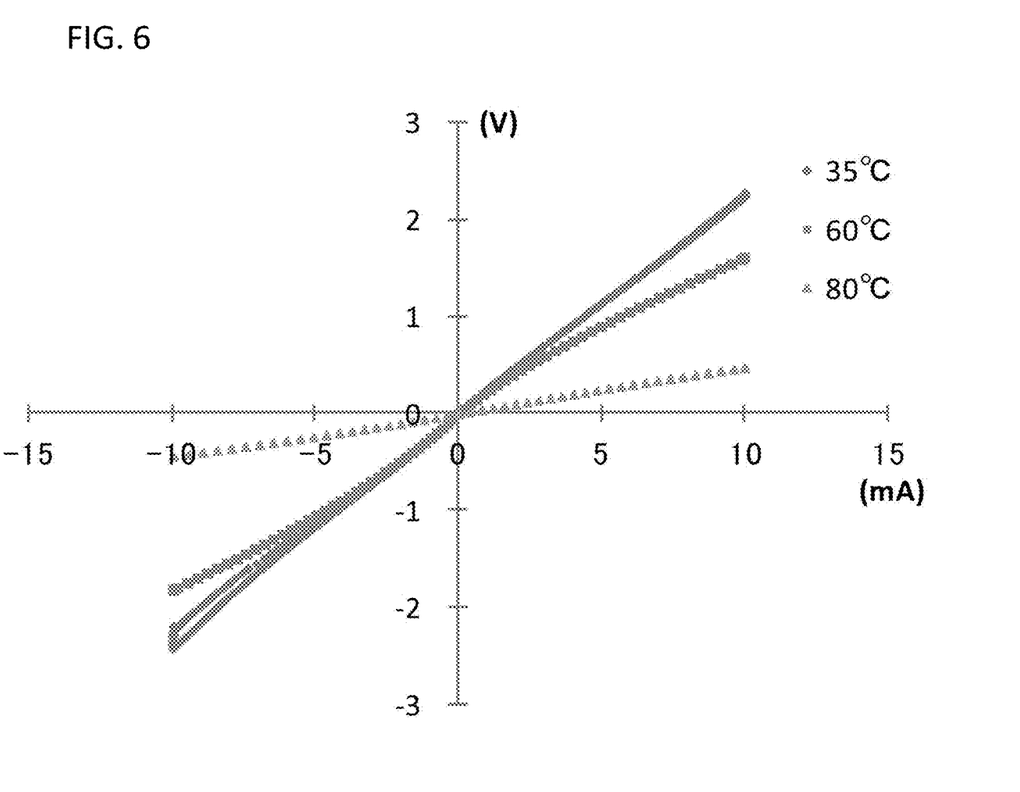
FIG. 6 is a graph showing the results of IV measurement in Comparative Example 1.

As a comparative example, a film was obtained in the same manner as in Example 1 using a Si substrate instead of a sapphire substrate. The results of the XRD are shown in FIG. 5. The result of IV is shown in FIG. 6, and the evaluation result of the thermistor characteristics is shown in FIG. 4.

In Comparative Example 1, a film having thermistor characteristics was not obtained, whereas in Example 1, a film containing spinel-type γ-$MnO_2$ having good thermistor characteristics was obtained.

Example 2

A film having a thickness of 500 nm was obtained in the same manner as in Example 1 except that a nickel acetylacetonate aqueous solution ($Ni(acac)_2(H_2O)_2$), cobalt acetylacetonate ($Co(acac)_2$), and manganese acetylacetonate ($Mn(acac)_3$) were mixed with methanol in a molar ratio of 1:2:3, respectively, to prepare a 0.05 M methanol solution, which was used as a raw material solution, and a flow rate of a carrier gas was used as a 3LPM. The obtained film was excellent in adhesiveness and sufficient in mechanical strength without causing peeling or the like. The film thickness variation was 30 nm as a result of examining the film thickness variation by a scan with a width of 5 mm using a low spatial frequency. Further, AFM measurement was performed, and the surface roughness (Ra) was measured, and found to be 43 nm.

Figure 8:
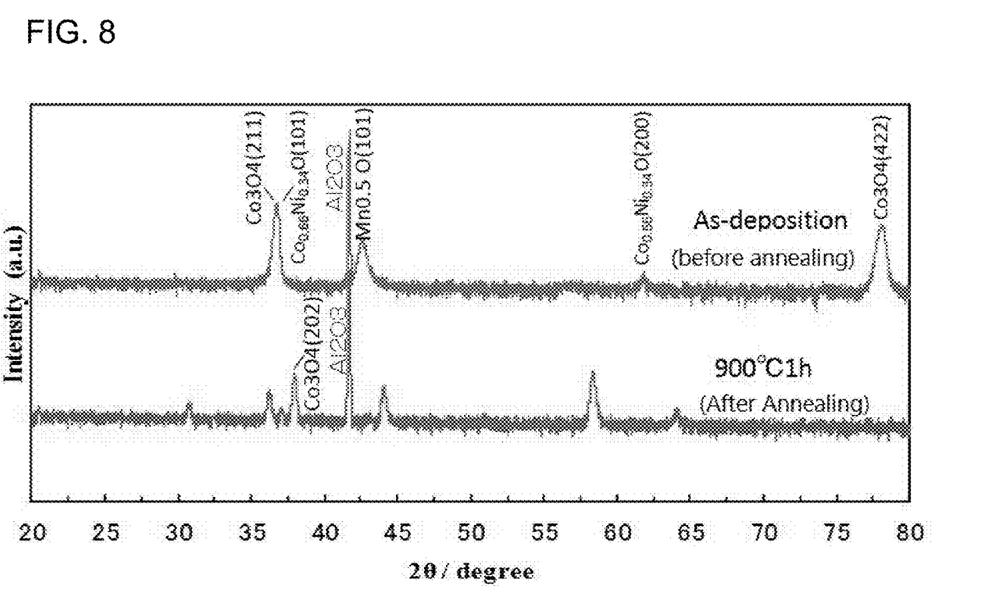
FIG. 8 is a graph showing XRD data before annealing and after annealing in Example 2.
Figure 9:
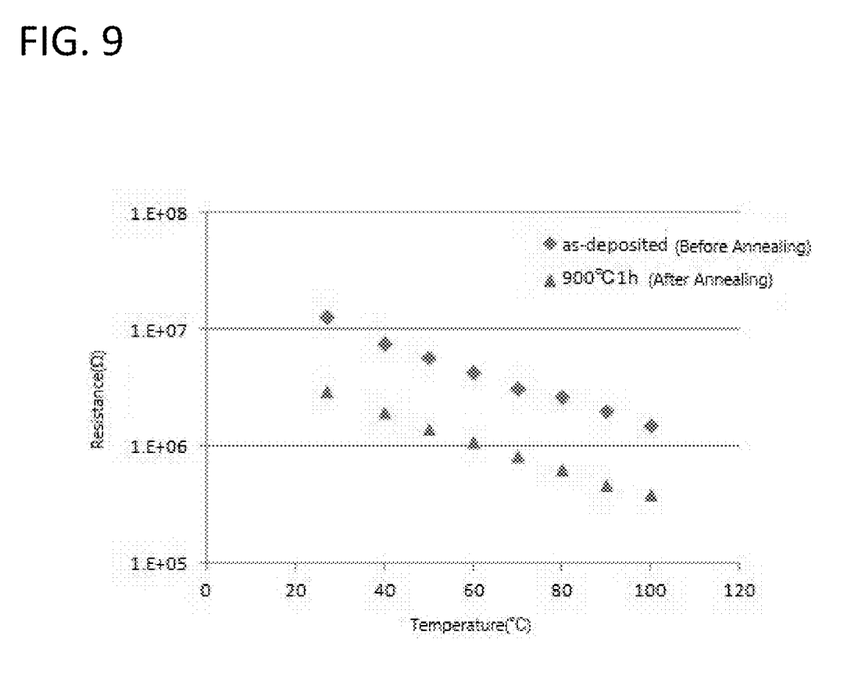
FIG. 9 is a graph showing evaluation results of thermistor characteristics before and after annealing in Example 2.

The thermistor film obtained in Example 2 was further annealed at 900° C. for 1 hour to examine changes before and after annealing. The measurement results of XRD are shown in FIG. 8. The evaluation results of the thermistor characteristics are shown in FIG. 9. As is apparent from FIG. 8, the spinel structure was confirmed in the thermistor film after annealing. As is clear from FIG. 8 and FIG. 9, it was found that the product of the disclosure obtained good thermistor characteristics regardless of the presence or absence of the spinel structure.

INDUSTRIAL APPLICABILITY

The thermistor film of the disclosure and the deposition method thereof are useful for manufacturing a thermistor element, and can be used for a temperature sensor or a gas sensor for temperature compensation of an electronic device. Such a temperature sensor or gas sensor is useful in a product such as an electronic device or a system including an electronic device.

EXPLANATION OF NUMBERS 1 deposition apparatus and method
2a carrier gas source
2b carrier gas (diluent) source
3a flow control valve
3b flow control valve
4 source of the mist
4a raw material solution
4b mist
5 vessel
5a water
6 ultrasonic vibrator
7 deposition chamber
8 hot-plate
9 feed pipe
10 substrate
30 power generation system
31 water storage tank
32 fuel cell system
33 fuel processor
34 stack
35 inverter
36 controller
37 fans
38 heat exchanger
39 distribution board
40 loads
41 sensor

The invention claimed is:

1. A thermistor film used in a thermistor element, wherein the thermistor film is an epitaxial film including a spinel-type crystal structure.

2. The thermistor film as claimed in claim 1, wherein the thermistor film contains γ-$MnO_2$.

3. A thermistor element comprising at least a thermistor film and an electrode, wherein the thermistor film is a thermistor film according to claim 1.

4. The thermistor element according to claim 3, wherein the thermistor film is laminated on a substrate having an uneven shape on a part or the whole of the surface directly or via another layer.

5. A product or system including the thermistor element as claimed in claim 3.

6. A thermistor film used in a thermistor element, wherein the thermistor film is an epitaxial film containing γ-$MnO_2$.

7. A thermistor element comprising at least a thermistor film and an electrode, wherein the thermistor film is a thermistor film according to claim 6.

8. The thermistor element according to claim 7, wherein the thermistor film is laminated on a substrate having an uneven shape on a part or the whole of the surface directly or via another layer.

9. A product or system including the thermistor element as claimed in claim 7.

* * * * *